(12) United States Patent
Mooney et al.

(10) Patent No.: US 7,681,944 B2
(45) Date of Patent: Mar. 23, 2010

(54) VENTING SPOILER GLASS MOVING MECHANISM

(75) Inventors: Robert Brady Mooney, Farmington Hills, MI (US); Robert Boyer Dickie, Canton, MI (US); David Lawrence Newkirk, Sterling, MI (US); Troy Donavan Allan, Howell, MI (US); Douglas Chester Carson, Brighton, MI (US)

(73) Assignee: Magna Closures Inc., Newmarket (CA)

( * ) Notice: Subject to any disclaimer, the term of this patent is extended or adjusted under 35 U.S.C. 154(b) by 0 days.

(21) Appl. No.: 12/136,204

(22) Filed: Jun. 10, 2008

(65) Prior Publication Data

US 2008/0303316 A1 Dec. 11, 2008

Related U.S. Application Data

(60) Provisional application No. 60/943,083, filed on Jun. 11, 2007.

(51) Int. Cl.
*B60J 7/19* (2006.01)
*B60J 7/047* (2006.01)
(52) U.S. Cl. ..................................... 296/224
(58) Field of Classification Search ................. 296/216.02–216.05, 224
See application file for complete search history.

(56) References Cited

U.S. PATENT DOCUMENTS

| 4,652,045 | A | 3/1987 | Hanley et al. |
| 4,982,995 | A | 1/1991 | Takahashi |
| 5,154,482 | A | 10/1992 | Hayashim et al. |
| 5,791,728 | A | 8/1998 | Hausrath |
| 7,144,077 | B2 * | 12/2006 | Grimm et al. ................ 296/223 |
| 7,273,248 | B2 * | 9/2007 | Boehm et al. ................ 296/223 |
| 2002/0117876 | A1 | 8/2002 | Sakai et al. |
| 2003/0151275 | A1 | 8/2003 | Ohnishi et al. |
| 2007/0085385 | A1 | 4/2007 | Sawada et al. |
| 2007/0114817 | A1 | 5/2007 | Becher et al. |
| 2007/0228779 | A1 | 10/2007 | Stallfort |

* cited by examiner

*Primary Examiner*—Dennis H Pedder
(74) *Attorney, Agent, or Firm*—Clark Hill PLC

(57) ABSTRACT

A panel assembly for covering and uncovering an opening in a vehicle includes a guide rail extending longitudinally therealong. A panel extends between front and rear edges and is movable relative to the guide rail. A guide mechanism is slidably coupled to the guide rail. A carrier bracket is fixedly secured to the panel and slidably coupled to the guide mechanism. A latch is operatively coupled to the panel and slidably coupled to the guide rail. The latch is operable between a locked position preventing longitudinal movement of the panel and an unlocked position allowing longitudinal movement of the panel. A motor drives the guide mechanism forward along the guide rail moving the panel from a close position to a venting position, and rearward along the guide rail actuating the latch to the unlocked position and moving the panel from the close position to an open position.

20 Claims, 4 Drawing Sheets

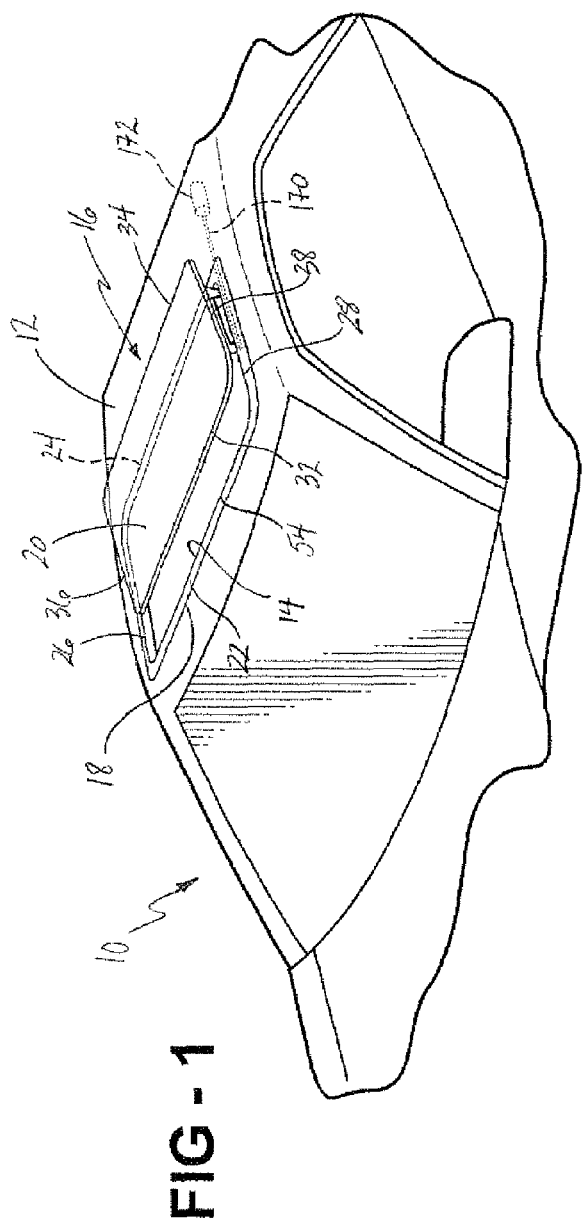
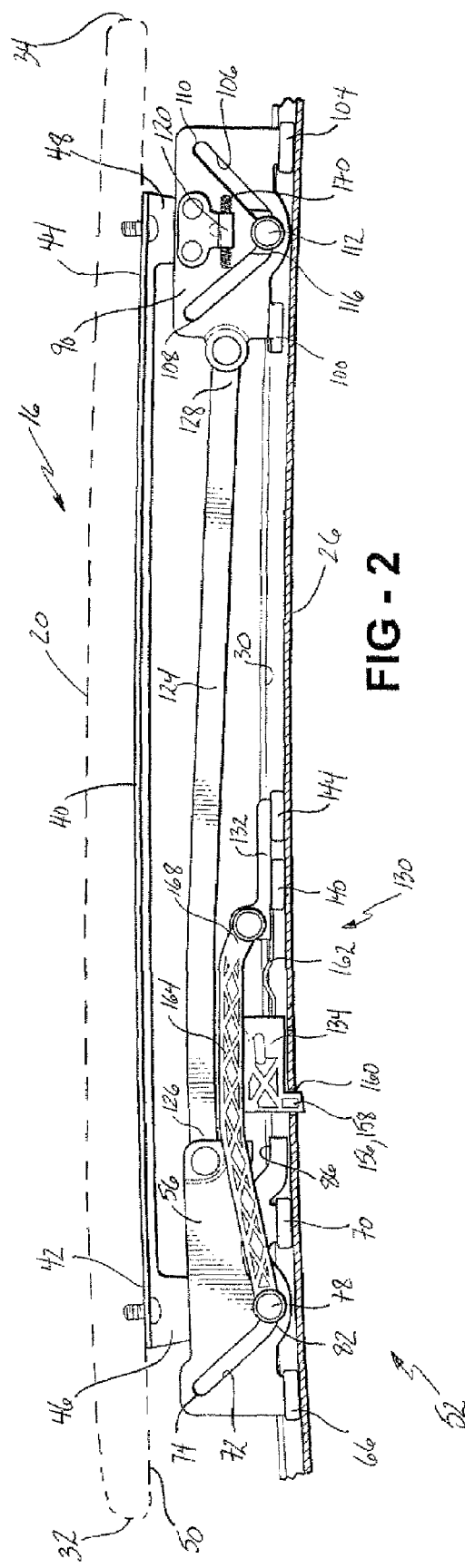
FIG-1
FIG-2

VENTING SPOILER GLASS MOVING MECHANISM

CROSS REFERENCE TO RELATED APPLICATION

This application claims the benefit of U.S. Provisional Application No. 60/943,083, filed Jun. 11, 2007.

FIELD OF THE INVENTION

The invention relates to a roof panel assembly for selectively covering and uncovering an opening in a roof of an automotive vehicle. More particularly, the invention relates to a roof panel assembly including a panel that is movable between a close position, a venting position, and an open position.

DESCRIPTION OF RELATED ART

A sunroof is a popular optional accessory for an automotive vehicle. The sunroof includes a panel that is movable relative to an opening formed in a roof of the vehicle. The panel is movable between a close position generally flush with the roof completely covering the opening and an open position disposed rearward of the close position allowing fresh air and/or sunlight to enter a passenger compartment of the vehicle. The panel is typically positionable at any of a plurality of partially open positions between the close and open positions. The panel may be moved manually or via an electric motor. Various sunroofs are well known to those skilled in the art and are disclosed in U.S. Pat. Nos. 4,678,228; 4,690,453; 4,732,422; 4,893,869; 5,058,947; and 5,405,185.

There are generally two types of conventional sunroofs. The first type retracts the panel rearward under the roof or into a roof structure such that the panel is at least partially hidden from view when in the open position. This first type of sunroof, however, sacrifices headroom in the passenger compartment for rear seat passengers. The second type, which is commonly known as a spoiler type sunroof includes a lifting mechanism to raise the panel to a sufficient height so that the panel will clear the roof to allow rearward sliding away from the close position without sacrificing headroom for rear seat passengers. It is common with the second type of sunroof that the panel is positionable at a venting position wherein the panel is tilted from the close position by raising a rear edge of the panel to a height above the roof to produce a ventilation gap between the rear edge and the roof. The lifting mechanism must also account for positioning the panel flush with the surrounding roof when the panel is in the close position.

It is important that a tight seal is formed between the panel and the roof when the panel is in the close position to prevent air, moisture, and noise from entering the passenger compartment of the vehicle. To accomplish this, a rubber seal is provided around the opening formed in the roof. However, tilting the panel into the venting position by raising the rear edge causes the front edge to lower which over-compresses the seal along a front edge of the opening. Repeated over-compression of the seal will cause the seal to degrades which will quickly lead to a leaky sunroof.

Therefore, it is desirable to provide a roof panel assembly including a panel that is movable to a venting position by raising a rear edge to a height above a roof and simultaneously raising a front edge to a height below the rear edge to prevent over-compression of a seal. Is also desirable that the front edge of the panel remain generally flush with the roof. It is further desirable to provide a simple and robust roof panel assembly having a minimum number of parts.

SUMMARY OF THE INVENTION

According to one aspect of the invention, a roof panel assembly includes a guide mechanism operatively coupled between a panel and a guide rail for sliding forward and rearward along the guide rail to move the panel between a close position covering a roof opening and a venting position wherein a rear edge of the panel is raised to a height above the roof opening and a front edge is simultaneously raised to a height below the rear edge.

BRIEF DESCRIPTION OF THE DRAWINGS

Advantages of the present invention will be readily appreciated as the same becomes better understood by reference to the following detailed description when considered in connection with the accompanying drawings wherein:

FIG. 1 is a fragmentary, perspective view of an automotive vehicle including a roof panel assembly according to the invention, illustrating a panel in a partially open position;

FIG. 2 is a side view of the roof panel assembly illustrating the panel in a close position;

DETAILED DESCRIPTION OF THE PREFERRED EMBODIMENT

Figure 3:
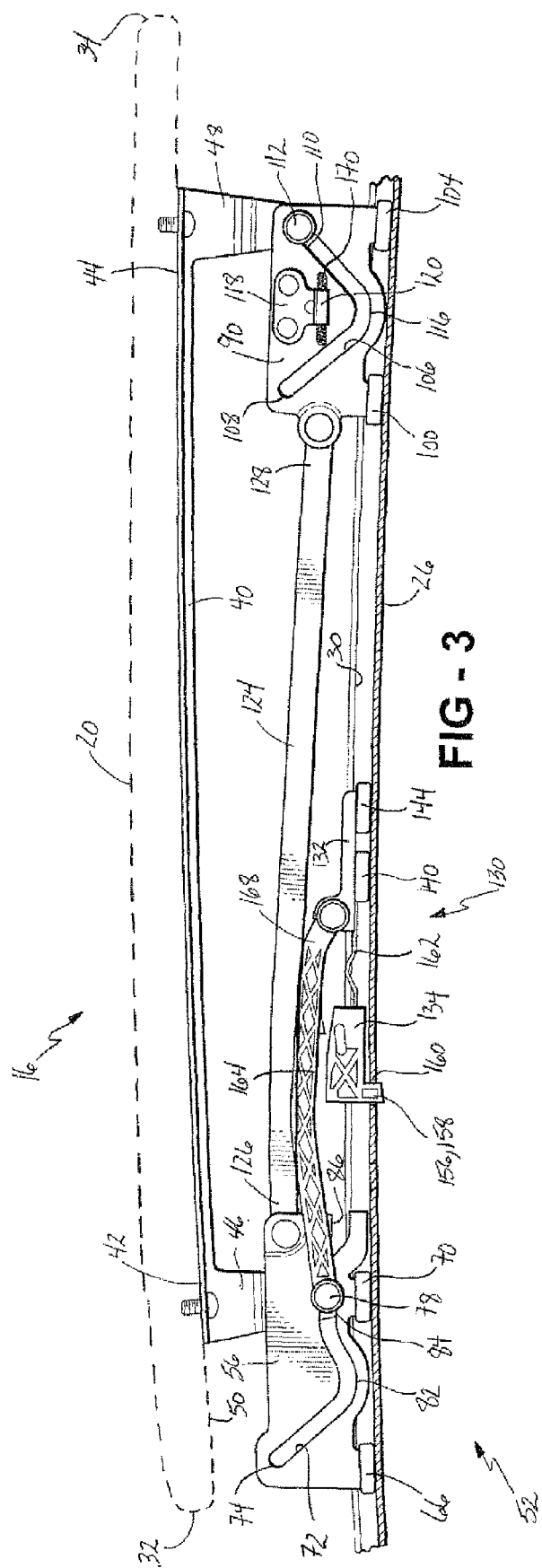
FIG. 3 is a side view of the roof panel assembly illustrating the panel in a venting position.

Referring to FIG. 1, an automotive vehicle is generally shown at 10, partially cutaway. The vehicle 10 includes a roof 12 defining an opening 14 therethrough. A roof panel assembly, generally shown at 16, is provided for selectively covering and uncovering the opening 14 in the roof 12. The roof panel assembly 16 includes a frame 18 that is adapted to fit around the opening 14 in the roof 12 and a panel 20 operatively coupled to the frame 18. The frame 18 includes a front member 22, a rear member 24, and a pair of spaced apart and parallel side members or guide rails 26, 28 extending therebetween. Each of the guide rails 26, 28 are generally C-shaped and define an upward facing channel 30. The guide rails 26, 28 extend longitudinally along the vehicle 10 defining a travel direction of the panel 20. Although the frame 18 is generally rectangular-shaped, it will be appreciated that the shape of the frame 18 may vary depending on the configuration of the opening 14. Further, it is contemplated that the frame 18 may be integrally formed with the roof 12, or that the roof 12 may contain a plurality of openings.

The panel 20 includes a front edge 32, a rear edge 34, and a pair of spaced apart and parallel side edges 36, 38 extending therebetween. The panel 20 is generally planar, although it is contemplated that the panel 20 may be non-planar.

Referring to FIGS. 2 through 5, a pair of spaced apart and parallel carrier brackets 40 (one shown) extends longitudinally between a forward end 42 and a rearward end 44. The forward end 42 of each carrier bracket 40 includes a forward leg 46 extending downwardly therefrom. The rearward end 44 of each carrier bracket 40 includes a rearward leg 48 extending downwardly therefrom. The carrier brackets 40 are fixedly secured to a bottom surface 50 of the panel 20 along the side edges 36, 38 for supporting the panel 20.

The roof panel assembly 16 also includes a pair of spaced apart and parallel guide mechanisms, generally shown at 52 (one shown). The guide mechanisms 52 operatively couple the panel 20 to the frame 18 for moving the panel 20 between a close position shown in FIG. 2, an open position shown in FIG. 4, and a venting position shown in FIG. 3. It is contemplated that the panel 20 is also positionable at any of a plurality of partially open positions between the close and open positions. In the close position, the panel 20 is generally flush with the roof 12 completely covering the opening 14. Also, in the close position the panel 20 evenly compresses a sealing member or rubber weather seal 54 extending along the frame 18 to provide a tight seal between a periphery of the panel 20 and the frame 18. The sealing member 54 prevents air, moisture, and noise from entering a passenger compartment of the vehicle 10. In the open position, the panel 20 is raised to a height above the roof 12 and is displaced rearward relative to the frame 18 at least partially uncovering the opening 14. The open position allows fresh air and/or sunlight to pass into the passenger compartment. In the venting position, the panel 20 is tilted from the close position by raising the rear edge 34 to a height above the roof 12 and simultaneously raising the front edge 32 to a height below the rear edge 34. The venting position defines a ventilation gap between the rear edge 34 of the panel 20 and the roof 12. The raised height of the front edge 32 is such that it remains generally flush with the roof 12 in the venting position but does not over-compress the sealing member 54 along the front member 22 of the frame 18.

One guide mechanism 52 is adjacent one of the side edges 36 of the panel 20 while the other guide mechanism is adjacent the other side edge 38 of the panel 20. Although reference is made only to one guide mechanism 52, it is appreciated that the following applies equally to the other guide mechanism. The guide mechanism 52 includes a front guide 56 disposed between the guide rail 26 and the forward end 42 of the carrier bracket 40. The front guide 56 includes a forward end 58, a rearward end 60, a first side 62, and a second side 64. A pair of first guide feet 66, 68 extends out in opposite directions from the forward end 58 of the front guide 56 substantially perpendicularly thereto. A pair of second guide feet 70 (one shown) extends out in opposite directions from the rearward end 60 of the front guide 56 substantially perpendicularly thereto. The first and second guide feet 66, 68 and 70 slidably couple the front guide 56 to the channel 30 of the guide rail 26.

Figure 4:
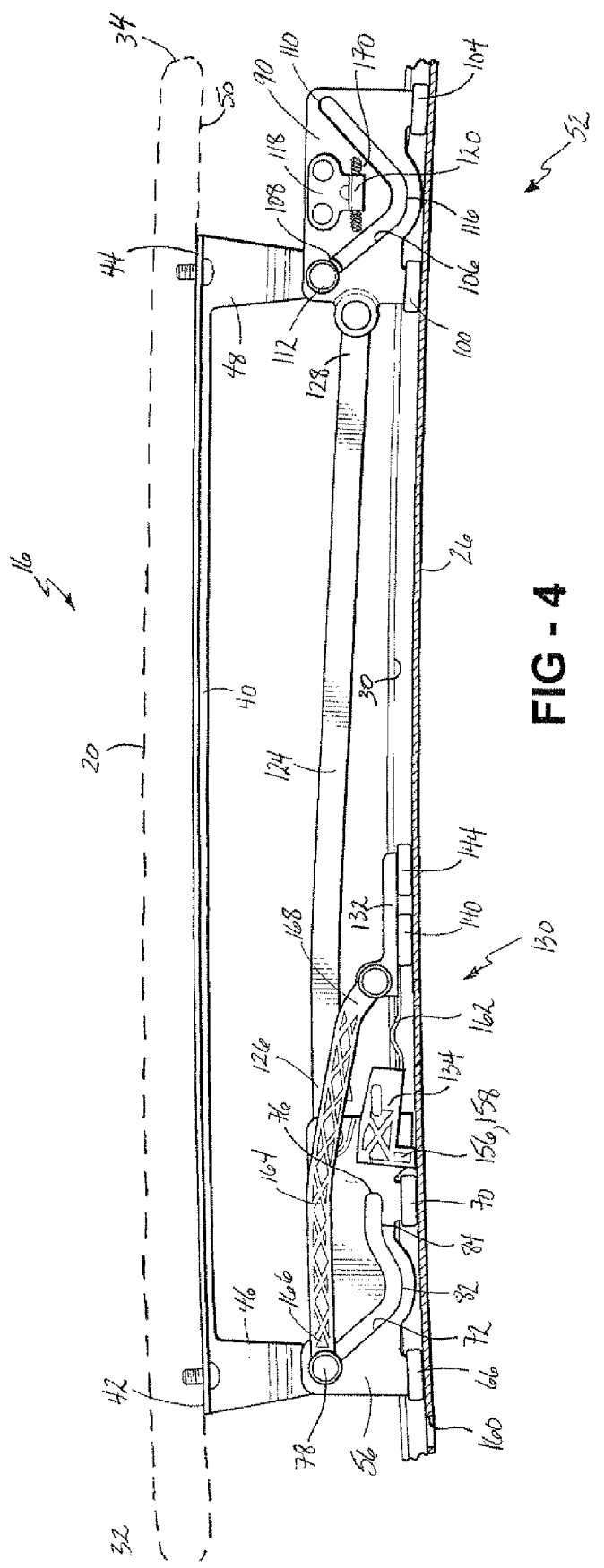
FIG. 4 is a side view of the roof panel assembly illustrating the panel in an open position.
Figure 5:
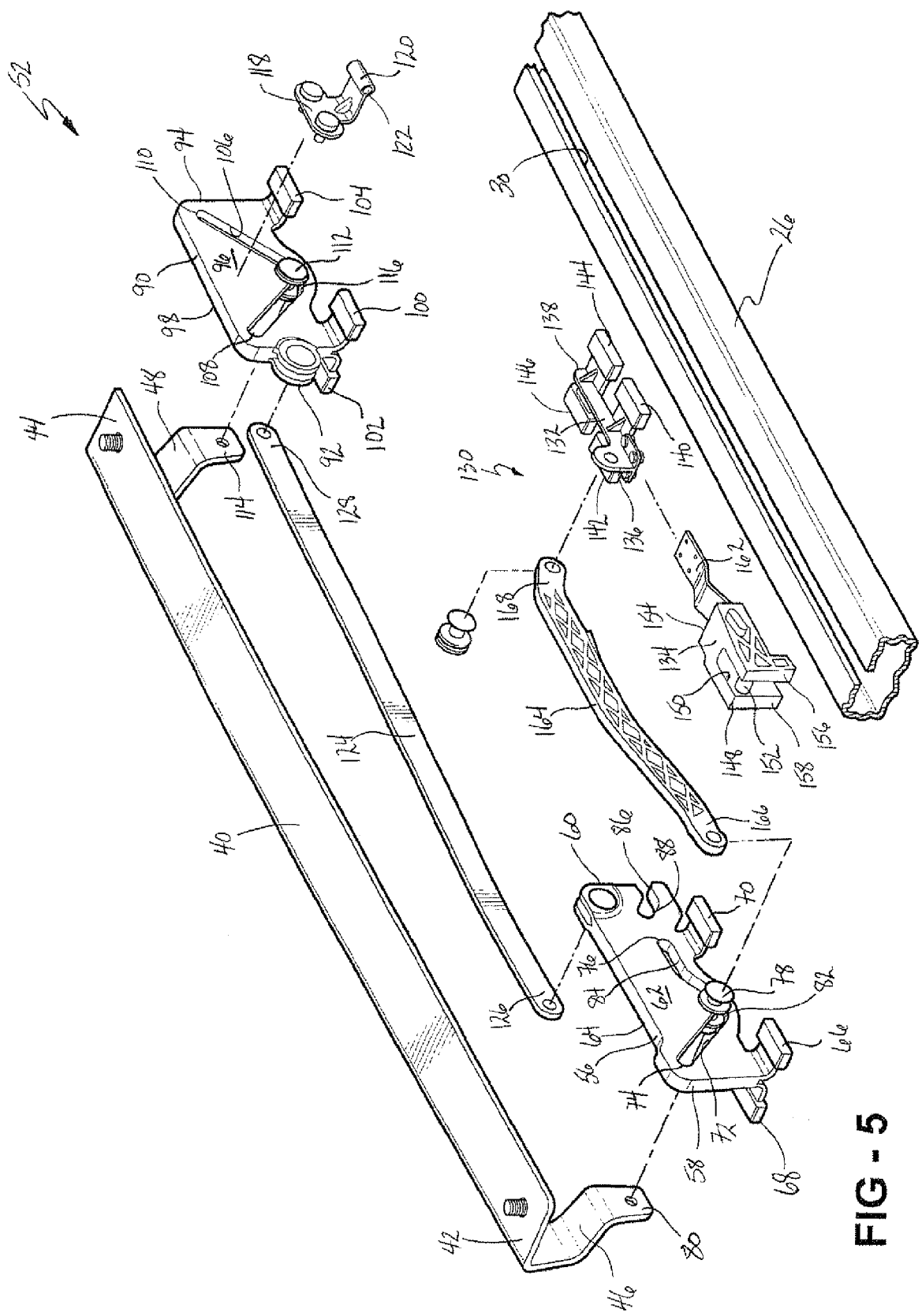
FIG. 5 is a fragmentary, exploded perspective view of the roof panel assembly.

A slot 72 extends between a first end 74 adjacent the forward end 58 of the front guide 56 and a second end 76 adjacent the rearward end 60 of the front guide 56. A laterally extending pin 78 is slidably disposed in the slot 72. A distal end 80 of the forward leg 46 is pivotally coupled to one end of the pin 78 adjacent the second side 64 of the front guide 56. When the panel 20 is in the close position, the pin 78 is disposed in a lower portion 82 of the slot 72, between the first and second ends 74, 76, as shown in FIG. 2. When the panel 20 is in the open position, the pin 78 is disposed at the first end 74 of the slot 72, as shown in FIG. 4. When the panel 20 is in the venting position, the pin 78 is disposed in an upper portion 84 of the slot 72, at the second end 76, as shown in FIG. 3.

The front guide 56 also includes a rearwardly facing mouth or catch 86 at the rearward end 60 thereof. The catch 86 defines an inclined portion 88.

The guide mechanism 52 also includes a rear guide 90 disposed between the rearward end 44 of the carrier bracket 40 and the guide rail 26. The rear guide 90 includes a forward end 92, a rearward end 94, a first side 96, and a second side 98. A pair of first guide feet 100, 102 extends out in opposite directions from the forward end 92 of the rear guide 90 substantially perpendicularly thereto. A pair of second guide feet 104 (one shown) extends out in opposite directions from the rearward end 94 of the rear guide 90 substantially perpendicularly thereto. The first and second guide feet 100, 102 and 104 slidably couple the rear guide 90 to the channel 30 of the guide rail 26.

A generally V-shaped slot 106 extends between a first end 108 adjacent the forward end 92 of the rear guide 90 and a second end 110 adjacent the rearward end 94 of the rear guide 90. A laterally extending pin 112 is slidably disposed in the slot 106. A distal end 114 of the rearward leg 48 is pivotally coupled to one end of the pin 112 adjacent the second side 98 of the rear guide 90. When the panel 20 is in the close position, the pin 112 is disposed in a lower portion 116 of the slot 106, between the first and second ends 108, 110, as shown in FIG. 2. When the panel 20 is in the open position, the pin 112 is disposed at the first end 108 of the slot 106, as shown in FIG. 4. When the panel 20 is in the venting position, the pin 112 is disposed at the second end 110 of the slot 106, as shown in FIG. 3.

The rear guide 90 also includes a bracket 118 fixedly secured to the first side 96 between the forward and rearward ends 92, 94. The bracket 118 includes a drive nut 120 fixedly secured thereto. The drive nut 120 has a threaded through-hole 122.

A connecting rod 124 is pivotally coupled between the rearward end 60 of the front guide 56 and the forward end 92 of the rear guide 90. More specifically, the connecting rod 124 extends between a first or forward end 126 pivotally coupled to the rearward end 60 of the front guide 56 and a second or rearward end 128 pivotally coupled to the forward end 92 of the rear guide 90. The connecting rod 124 connects the front and rear guides 56, 90 to synchronize fore and aft sliding movement of the guide mechanism 52 along the guide rail 26.

A latch mechanism, generally shown at 130, is disposed between the front guide 56 and the rear guide 90. The latch mechanism 130 includes a body portion 132 and a head portion 134. The body portion 132 extends between a forward end 136 and a rearward end 138. A pair of first guide feet 140, 142 extends out in opposite directions from the forward end 136 of the body portion 132 substantially perpendicular thereto. A pair of second guide feet 144, 146 extends out in opposite directions from the rearward end 138 of the body portion 132 substantially perpendicular thereto. The first and second guide feet 140, 142 and 144, 146 slidably couple the latch mechanism 130 to the channel 30 of the guide rail 26.

The head portion 134 is operatively coupled to the body portion 132 for locking and unlocking the latch mechanism 130 to the guide rail 26. The head portion 134 includes a forward end 148 defining a channel 150 across which a dowel 152 extends and a rearward end 154. A pair of legs 156, 158 extends downwardly from the forward end 148 of the head portion 134 for engaging an aperture 160 formed in the channel 30 of the guide rail 26. A flex arm 162 extends between the rearward end 154 of the head portion 134 and the forward end 136 of the body portion 132. The flex arm 162 allows the head portion 134 to move between a locked position, wherein the legs 156, 158 are engaged with the aperture 160 thereby locking the latch mechanism 130 in place, and an unlocked position, wherein the legs 156, 158 are disengaged from the aperture 160 thereby unlocking the latch mechanism 130. The catch 86 formed in the rearward end 60 of the front guide 56 engages the dowel 152 to move the head portion 134 between the locked and unlocked positions.

The latch mechanism 130 is operatively coupled to the panel 20 by a lift arm 164. The lift arm 164 extends between a first or forward end 166 pivotally coupled to the pin 78 adjacent the first side 62 of the front guide 56 and a second or rearward end 168 pivotally coupled to the forward end 136 of the body portion 132 of the latch mechanism 130. With the head portion 134 of the latch mechanism 130 in the locked position, the panel 20 is prevented from moving longitudinally along the guide rail 26. Therefore, the guide mechanism 52 can only move the panel 20 between the close position and the venting position. With the head portion 134 of the latch mechanism 130 in the unlocked position, the panel 20 is allowed to move longitudinally along the guide rail 26. Therefore, the guide mechanism 52 can move the panel 20 between the close position and the open position.

The drive nut 120 threadingly engages a flexible driveshaft or cable 170. More specifically, the cable 170 extends through the threaded through-hole 122 of the drive nut 120 so that rotation of the cable 170 will cause the drive nut 120 to move therealong in either a first direction or a second direction, which will drive the guide mechanism 52 forward and rearward along the guide rail 26.

A reversible motor 172, best seen in FIG. 1, is mounted along the guide rail 26 and is operatively coupled to an end of the cable 170 effecting rotation thereof. Upon activation, the motor 172 will rotate the cable 172 in either a clockwise or counterclockwise direction.

The operation of the roof panel assembly 16 will now be described with reference to FIGS. 2 through 4. Referring first to FIG. 2, when the panel 20 is in the close position, the head portion 134 of the latch mechanism 130 is in the locked position and the pins 78, 112 are disposed in the lower portions 82, 116 of the slots 72, 106 in the respective front and rear guides 56, 90. As a result, the panel 20 is generally flush with the roof 12 completely covering the opening 14 and in tight, sealing engagement with the sealing member 54 extending along the frame 18.

Upon rotation of the cable 170 in the clockwise direction the drive nut 120 moves in the first direction along the cable 170, thus moving the guide mechanism 52 forward along the guide rail 26. As the guide mechanism 52 moves forward, the slot 106 in the rear guide 90 urges the pin 112 upwardly from the lower portion 116 to the second end 110 raising the rear edge 34 of the panel 20 above the roof 12. At the same time, the slot 72 in the front guide 56 urges the pin 78 upwardly from the lower portion 82 to the upper portion 84 slightly raising the front edge 32 of the panel 20 to prevent overcompression of the sealing member 54 while maintaining the panel 20 generally flush with the roof 12. The panel 20 is now in the venting position, as shown in FIG. 3.

Beginning again with the panel 20 in the close position, upon rotation of the cable 170 in the counterclockwise direction the drive nut 120 moves in the second direction along the cable 170, thus moving the guide mechanism 52 rearward along the guide rail 26. As the guide mechanism 52 moves rearward, the slot 106 in the rear guide 90 urges the pin 112 upwardly from the lower portion 116 to the first end 108 raising the rear edge 34 of the panel 20 above the roof 12. At the same time, the slot 72 in the front guide 56 urges the pin 78 upwardly from the lower portion 84 to the first end 74 raising the front edge 32 of the panel 20 above the roof 12. As the guide mechanism 52 continues to move rearward along the guide rail 26, the catch 86 receives the dowel 152 of the head portion 134 of the latch mechanism 130. The dowel 152 travels along the inclined portion 88 of the catch 86 forcing the head portion 134 from the locked position to the unlocked position thereby unlocking the latch mechanism 130 from the channel 30 of the guide rail 26. The guide mechanism 52 continues to move rearwardly along the guide rail 26 until the panel 20 is in the open position, as shown in FIG. 4.

It is appreciated that although the roof panel assembly 16 is shown with regard to the panel 20 and the opening 14 in the roof 12, the panel assembly 16 may also be utilized with various other panels including, but not limited to, vertical and horizontal sliding doors, decklids, glass panels, sun visors, and vertical glass.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A roof panel assembly for selectively covering and uncovering an opening in a roof of an automotive vehicle, said roof panel assembly comprising:
    at least one guide rail extending longitudinally along the opening;
    a panel extending between front and rear edges, said panel movable relative to said guide rail;
    at least one guide mechanism including a front guide slidably coupled to said guide rail and having a slot formed therein, a rear guide slidably coupled to said guide rail and having a slot formed therein, and a connecting rod pivotally coupled between said front and rear guides;
    at least one carrier bracket fixedly secured to said panel for supporting said panel and extending longitudinally between a forward end slidably coupled to said slot in said front guide and a rearward end slidably coupled to said slot in said rear guide;
    a latch mechanism slidably coupled to said guide rail, said latch mechanism operable between a locked position preventing longitudinal movement of said panel and an unlocked position allowing longitudinal movement of said panel;
    a lift arm pivotally coupled to said forward end of said carrier bracket and pivotally coupled to said latch mechanism; and
    a reversible motor operatively coupled to said guide mechanism for driving said guide mechanism forward and rearward along said guide rail whereby said slots urge said carrier bracket to move said panel between a close position completely covering the opening, a venting position wherein said rear edge is raised above the roof and said front edge is simultaneously raised to a height below said rear edge, and an open position at least partially uncovering the opening wherein said panel is displaced rearward relative to the opening.

2. A roof panel assembly as set forth in claim 1 wherein said rearward movement of said guide mechanism along said guide rail raises said front and rear edges of said panel above the roof and during said rearward movement of said guide mechanism said front guide actuates said latch mechanism to said unlocked position thereby allowing rearward movement of said panel from said close position to said open position.

3. A roof panel assembly as set forth in claim 1 wherein said carrier bracket includes a first pin at said forward end thereof and a second pin at said rearward end thereof, said first pin slidably disposed in said slot in said front guide and said second pin slidably disposed in said slot in said rear guide.

4. A roof panel assembly as set forth in claim 3 wherein said latch mechanism is disposed between said front guide and said rear guide.

5. A roof panel assembly as set forth in claim 4 wherein said latch mechanism includes a body portion slidably coupled to said guide rail and a head portion coupled to said body portion, said head portion movable between a locked position engaged with said guide rail and an unlocked position disengaged with said guide rail.

6. A roof panel assembly as set forth in claim 5 wherein said head portion is disposed between said body portion and said front guide.

7. A roof panel assembly as set forth in claim 6 wherein said head portion is in said locked position when said panel is in said close and venting positions, and wherein said head portion is in said unlocked position when said panel is in said open position.

8. A roof panel assembly as set forth in claim 5 wherein said lift arm extends between a first end pivotally coupled directly to said first pin and a second end pivotally coupled directly to said body portion of said latch mechanism.

9. A roof panel assembly as set forth in claim 5 including a flex arm flexibly coupling said head portion to said body portion to allow movement of said head portion between said locked and unlocked positions.

10. A roof panel assembly as set forth in claim 5 wherein a rearward end of said front guide includes a catch engageable with said head portion to move said head portion from said locked position to said unlocked position in response to said rearward movement of said guide mechanism.

11. A roof panel assembly as set forth in claim 10 wherein a forward end of said head portion includes a channel having a dowel extending thereacross, said catch engageable with said dowel to move said head portion from said locked position to said unlocked position in response to said rearward movement of said guide mechanism.

12. A roof panel assembly as set forth in claim 5 wherein said guide rail includes an aperture, said head portion engaged with said aperture in said locked position and said head portion disengaged with said aperture in said unlocked position.

13. A roof panel assembly as set forth in claim 1 wherein said close position of said panel corresponds with a first position of said guide mechanism, said venting position of said panel corresponds with a second position of said guide mechanism forward of said first position, and said open position of said panel corresponds with a third position of said guide mechanism rearward of said first position.

14. A roof panel assembly as set forth in claim 13 wherein said forward movement of said guide mechanism along said guide rail from said first position to said second position raises said front and rear edges of said panel.

15. A roof panel assembly as set forth in claim 13 wherein said rearward movement of said guide mechanism along said guide rail from said first position to said third position raises said front and rear edges of said panel and during said rearward movement of said guide mechanism said front guide actuates said latch mechanism to said unlocked position thereby allowing rearward movement of said panel to said open position.

16. A roof panel assembly as set forth in claim 3 wherein said slot in said front guide extends between a first end adjacent a forward end of said front guide and a second end adjacent a rearward end of said front guide, and wherein said slot in said rear guide extends between a first end adjacent a forward end of said rear guide and a second end adjacent a rearward end of said rear guide.

17. A roof panel assembly as set forth in claim 16 wherein said close position of said panel corresponds with said first pin disposed at a lower portion of said slot in said front guide between said first and second ends thereof and said second pin disposed at a lower portion of said slot in said rear guide between said first and second ends thereof.

18. A roof panel assembly as set forth in claim 17 wherein said first and second ends of said slot in said front guide are disposed above said lower portion of said slot in said front guide and said first and second ends of said slot in said rear guide are disposed above said lower portion of said slot in said rear guide.

19. A roof panel assembly as set forth in claim 16 wherein said venting position of said panel corresponds with said first pin disposed at said second end of said slot in said front guide and said second pin disposed at said second end of said slot in said rear guide.

20. A roof panel assembly as set forth in claim 16 wherein said open position of said panel corresponds with said first pin disposed at said first end of said slot in said front guide and said second pin disposed at said first end of said slot in said rear guide.

* * * * *